UNITED STATES PATENT OFFICE.

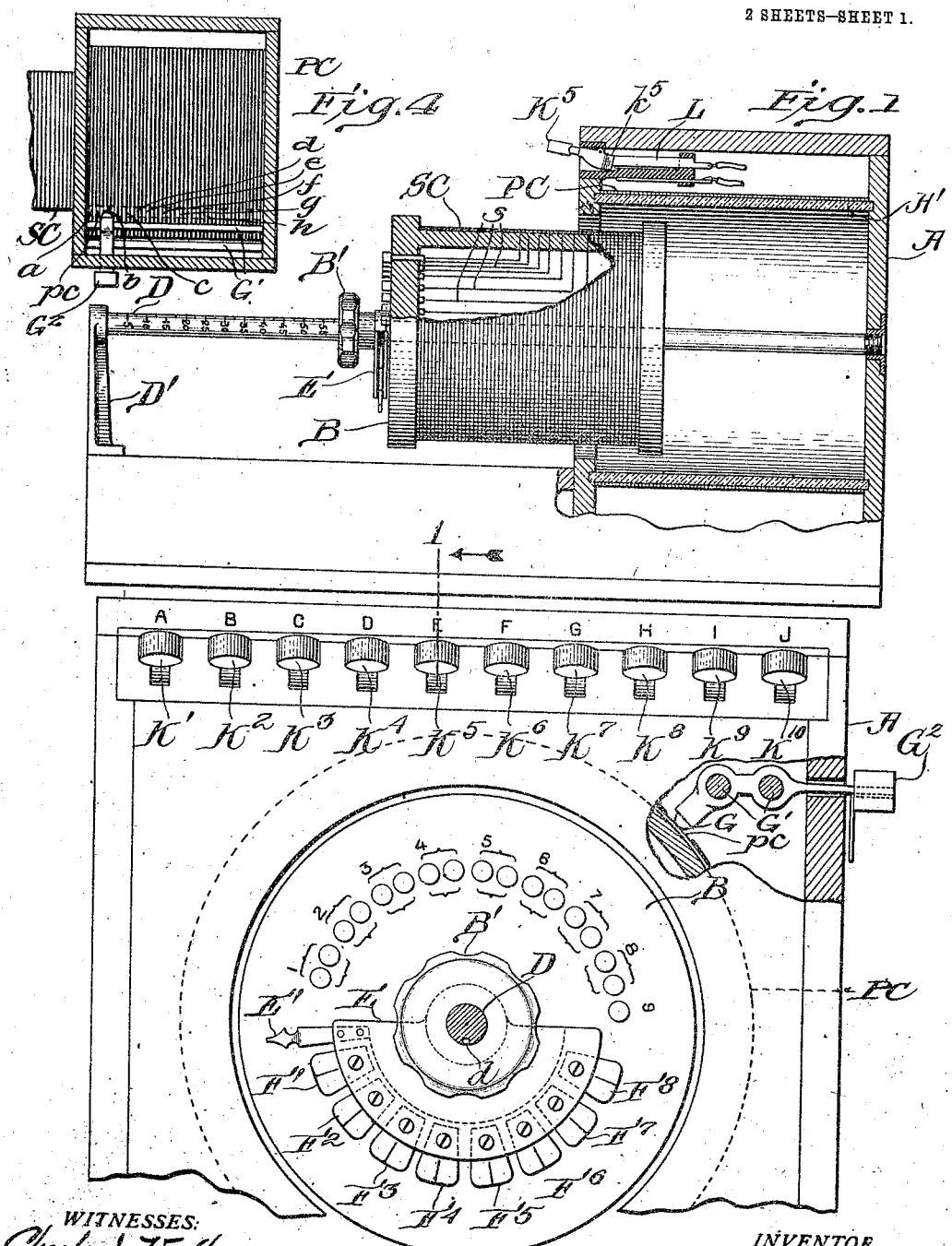

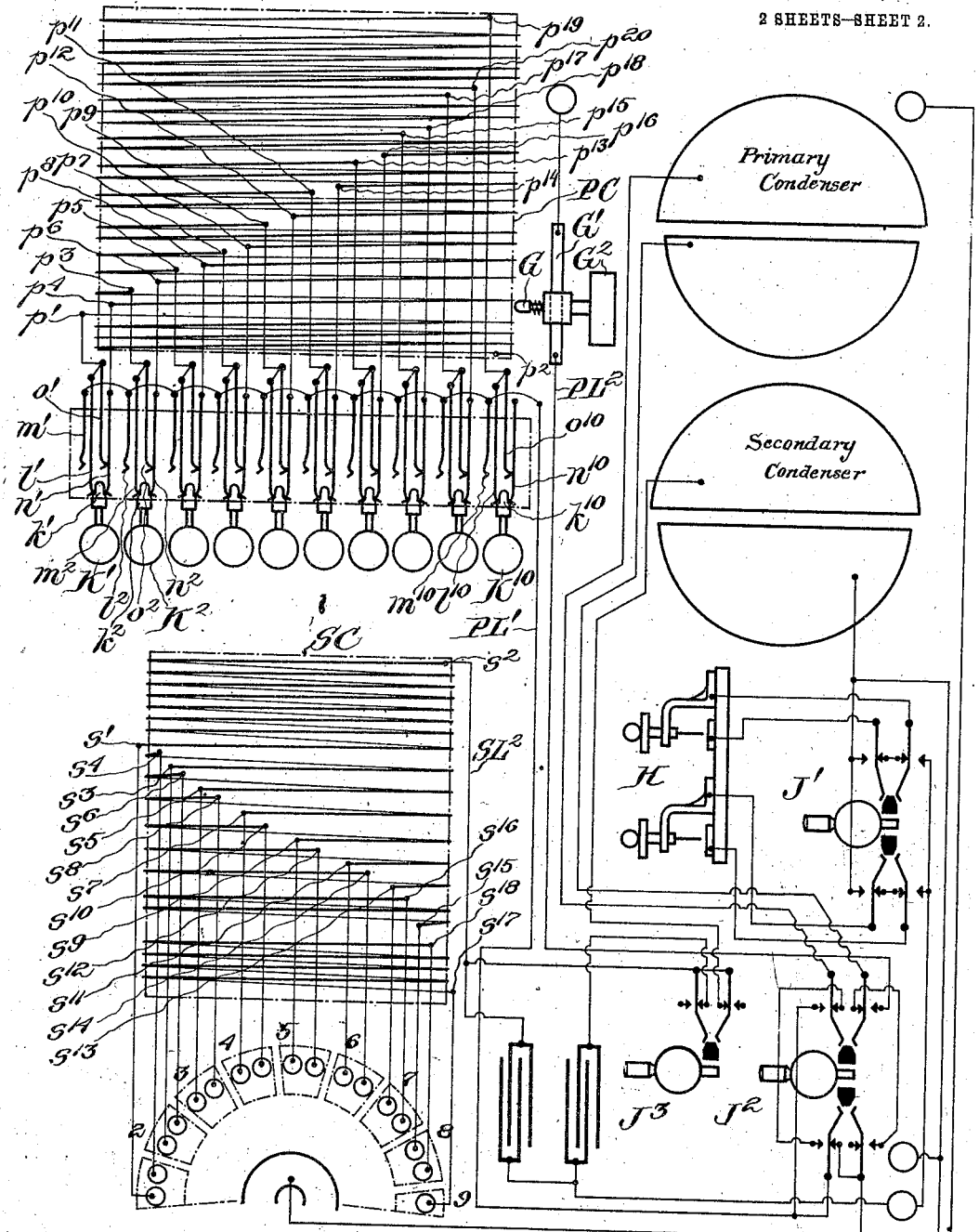

WILLIAM L. WALKER, OF BOSTON, MASSACHUSETTS.

INTERFERENCE-PREVENTER FOR WIRELESS-TELEGRAPH CIRCUITS.

1,042,855.

Specification of Letters Patent.

Patented Oct. 29, 1912.

Application filed January 27, 1910. Serial No. 540,318.

*To all whom it may concern:*

Be it known that I, WILLIAM L. WALKER, a citizen of the United States, and resident of Boston, in the county of Suffolk and State of Massachusetts, have invented new and useful Improvements in Interference-Preventers for Wireless-Telegraph Circuits, of which the following is a specification.

My invention relates to tuning instruments for wireless telegraph receiving stations, and consists in improvements in the construction of inductance coils and associated apparatus, whereby the operator has at his disposal a large variety of inductance values, with control and handling devices which enable him to select different inductance values with ease, precision and rapidity.

By employing my improved tuning apparatus, the receiving operator can readily minimize or prevent interference from wave sources to which his resonant circuit is not attuned, and at the same time may preserve or emphasize the clearness and intensity of the signals he desires to receive. As sharp resonance obtained by a given adjustment of the circuit may result in failure to obtain desired signals—the circuit being slightly out of the exact proper adjustment,—the invention includes an arrangement by which dull resonance may be utilized when the operator is waiting for signals of which the periodicity is not known.

The orderly arrangement and simplicity of the mechanical adjuncts of my improved tuning apparatus afford an easy and accurate mode of tuning the station with any known antenna within range, or a receiving instrument for a suitable standard wave length, and in general enables the operator to utilize existing conditions to best advantage.

In the drawings hereto annexed which illustrate my invention in its preferred form,—Figure 1 is an elevation, partly in section, (taken at the dotted line marked 1 in Fig. 2) showing a mode of mounting the coils of a transformer; Fig. 2 shows, on a larger scale, the front of a part of the apparatus, in elevation, a portion being broken away to show parts of the interior; Fig. 3 shows the electrical arrangement of the tuning apparatus, diagrammatically; and Fig. 4 is a horizontal section on a smaller scale taken through the case just above the primary coil.

Referring to Figs. 1 and 2, which illustrate the mechanical arrangements and convenient grouping of the several parts of the tuning apparatus; A represents a casing in which is mounted an inductance coil PC, the turns of which are wound upon a spool or cylinder A'. This coil, which we may regard and for convenience term a primary coil, is composed of a suitable number of inductance sections wound upon the cylinder A' and connected in the manner presently to be described with reference to Fig. 3. A complementary inductance coil which we may regard as the secondary, is shown at SC wound upon a spool or drum B, and this coil is also subdivided into a series of inductance sections, connected, arranged and controlled as will be described with reference to Fig. 3. The casing A is provided with an aperture preferably circular and concentric with the coils PC and SC and the spool B is mounted to slide axially upon a track represented by the rod D mounted in front upon the standard D' and at the rear upon a portion of the casing A. By means of a feather and groove connection indicated at $d$ in Fig. 2, the spool B and its inductance coil SC may slide but not rotate upon the supporting rod D. A controlling handle B' is mounted at the front of the spool B and carries the plate E and fingers E', F', F$^2$ etc. of a fan switch. The index finger E' of this fan switch is electrically connected through plate E to the rod D which affords means for making connection with an outside lead. The fingers F' to F$^8$ inclusive of the fan switch are mounted in an insulating sector.

Contact pieces arranged in pairs and seated in insulating material at the face of the spool B are shown in Fig. 2 at stations 1, 2, 3, 4, 5, 6, 7, 8, and 9 and these contact members, as will be described in connection with Fig. 3, afford, in coöperation with the fan switch, convenient means for determining and selecting the inductance values of the secondary coil SC.

The subdivisions of inductance sections of the primary coil PC are selectively included in circuit by means of the keys K' to K$^{10}$ inclusive which are shown in Fig. 2 as occupying stations marked on the casing with letters from A to J inclusive. These keys operate upon contact members generally designated in Fig. 1 by L, by the action of wedge-shaped ends such as $k^5$ also seen in Fig. 1. One of the inductance subdivisions or sections of the primary coil PC is in contact with a sliding member G which is joined electrically to one of the main leads of the apparatus. This sliding member is indicated in part in Fig. 2 and is carried by the handle $G^2$ which operates the contact member by sliding back and forth upon the slide or track $G'$. The track or rod D will preferably be marked or calibrated with a scale as shown in Fig. 1 for convenience in determining the position of the spool B upon the track. The sliding member G travels on slide-rods $G'$, $G'$ and is operated by the handle $G^2$. The insulation of the wires which form the first section of the primary coil PC is removed as at $pc$ (Fig. 2) so that the conductive member G may make electrical contact with any turn of the wire. In Fig. 4, the sectional character of the coil PC is indicated; the first section having its terminal at $a$, and succeeding sections at $b$, $c$, $d$, $e$, $f$, $g$, $h$, and so on. Lead wires, shown in part in Fig. 1, connect these terminals with the contact members L, in the manner diagrammatically illustrated in Fig. 3. Connections collectively designated as $s$ (Fig. 1) establish communication between sections of the secondary coil SC and the contact points at stations 1, 2, 3, 4, 5, 6, 7, 8, 9,—in the manner presently to be described, and illustrated diagrammatically in Fig. 3.

Referring now to Fig. 3: The two mutually complementary inductance coils PC and SC are shown in diagram. The coil PC is subdivided into inductance sections. The first section included between points $p'$, $p^2$, which we will regard arbitrarily as the first section in the coil, makes contact with the sliding contact shoe G which is carried on the track $G'$ and operated by the handle $G^2$ previously referred to in connection with Fig. 2. This sliding contact affords a fractional adjustment of inductance values by connecting in at individual turns of the coil between $p'$ and $p^2$ and it is through this sliding contact piece that connection is made to the main lead $PL^2$. The other main lead $PL'$ terminates in a plurality of contact points of which the first is marked $m'$ and the last in series $m^{10}$ any one of which may be selected as the lead connection to $PL'$. The keys $K'$ to $K^{10}$, inclusive, provided with wedgeshaped operative ends at $k'$ to $k^{10}$, inclusive, operate upon spring members or contact pens $l'$ $n'$ to $l^{10}$ $n^{10}$ inclusive. The contact members which (under the control of keys $K'$ to $K^{10}$ inclusive) determine the selected inductance values in the coil PC are arranged in groups, each group comprising two pairs. Thus the first group comprises the pair of contact members $m'$ $l'$ and another pair $o'$ $n'$. All of the contact members $n'$ to $n^{10}$ inclusive are connected with the main lead $PL'$; the members $l'$ $o'$, one from each pair of the first group of contact members, are connected with the terminal $p'$ of the first inductance section of the coil PC. The remaining member $n'$ of the second pair of the first group is connected with a terminal $p^4$ of the coil next in series to the first coil which lies between $p'$ and $p^2$. The arrangement of the other groups of contact members is identical with that of the first with the exception that the last group, though shown as identical in construction with the others, includes a member $n^{10}$ which performs no electrical function but is provided merely for the sake of uniformity in construction and for facility in building up a longer series of contact groups if it should be desired. The inductance sections or subdivisions have for their respective terminals the points $p^1$, $p^2$, $p^3$, $p^4$, $p^5$, $p^6$, $p^7$, $p^8$, $p^9$, $p^{10}$, $p^{11}$, $p^{12}$, $p^{13}$, and so on to $p^{19}$, $p^{20}$. The odd numbered terminal points from $p'$ to $p^{19}$, may be selectively connected through the pairs of contact members $l'$ $n'$ to $l^{10}$ $n^{10}$ inclusive with the main lead $PL'$. The controlling keys $K'$ to $K^{10}$ are shown in Fig. 3 in the positions represented by Figs. 1 and 2 so that the wedge shaped ends $k'$ to $k^{10}$ inclusive are withdrawn to allow the contact members $l'$ $m'$ to $l^{10}$ $m^{10}$ inclusive to be cut out of contact and the pairs of contact members $n'$ $o'$ to $n^{10}$ $o^{10}$ to be in contact. If, now, one of the keys as $K'$ be depressed so as to swing its wedge shaped end $k'$ forward and upward, the contact members $l'$ $n'$ will be forced apart breaking the contact between $n'$ and $o'$ and making contact between $m'$ and $l'$ and thus connecting the terminal point $p'$ with the main lead $PL'$. The other main lead $PL^2$ will make connection with the coil between points $p'$ and $p^2$ at any desired turn by means of the sliding member G thus completing the circuit from one main lead to the other through an inductance section of the coil PC. When the keys $K'$ to $K^{10}$ are in elevated position as shown in Figs. 1 and 2, the disposition of the groups of contact members is such that all of the inductance sections of the coil PC are connected in series and the first coil is always in electrical connection with the main lead $PL^2$. The connection with the other main lead $PL'$ is selectively determined by the depression of one of the keys so that whatever key is depressed the inductance sections between the first section and that controlled by the key selected will be included in the series between the main leads, and all those inductance sections which are not so included are left completely open or dead-ended so that they do not produce disturbing resonance and are entirely eliminated to all practical intents and purposes.

In summary, the arrangement of the primary coil and its sections is as follows: The primary coil is subdivided into independent sections, normally in series connected with each other, but out of circuit with the outside, or main, leads. Groups of coil-section connectors are provided, each group consisting of two pairs of contact members, one of the first pair connected to one of the main leads, the other of that first pair together with one of the second pair connected to a terminal or coil-section, the remaining one of the second pair connected to a terminal of the next section, the first pair normally out of electrical contact with each other, the second pair normally in contact. The first coil-section is connected at one terminal with a contact member of its group, at its other terminal with a main lead, preferably by sliding or step by step contact. The last coil section is normally dead-ended. A controller is provided to operate with each group of contact members, its action, to throw the condition out of normal, is to cause the members of the first pair of contact members to make contact, and to break contact between the members of the second pair. This breaks the normal series connection between the coil sections on either side of the contact member group affected; and at the same time puts the coil section next on one side of the group into connection with a main lead, the other main lead being always in contact with the first coil section of the series. Simultaneous operation of two controllers places two coil sections, or groups of coil sections, in circuit in parallel; if adjacent contact member groups are shifted from normal, then the adjacent coil sections will be put in parallel between the main leads, if two non-adjacent controllers are operated, then the coil sections between the first section and the first operated controller as one coil, will be in parallel with the coil sections between the first and second operated controller, as another coil. Thus any number of coil sections may be put in between the main leads in series, and pairs of sections or groups of sections may be put in between the main leads, in parallel. A large selection of inductance values is thus made available. Coil sections not in connection are open at both ends, and thus introduce no disturbing resonances. The sliding main lead contact, stepping turn by turn on the first coil section, affords fine adjustment. Though its operation may leave a portion of the first coil section only partially dead-ended, the disturbing resonance of this loose end is not to be reckoned with; its period will be so far out of harmonic range of the active coil sections.

The secondary coil SC like the primary is subdivided into inductance sections of which the first has one terminal $s^2$ in connection with the main lead SL². Normally the terminal points from $s'$ to $s^{18}$ inclusive of these inductance sections are open or dead-ended by the fan switch arrangement indicated in Fig. 2; these inductance sections of the secondary coil may be included cumulatively or by addition and subtraction between the main leads SL² and SL'. The contact points at the stations 1, 2, 3, 4, 5, 6, 7, 8 and 9 are with one exception arranged in pairs, the terminal point $s'$ of the first inductance section is connected to the first contact point of the pair at station 1, the other member of this pair being connected to the terminal point $s^4$ of the next adjacent inductance section. The other terminal point $s^3$ of this section is connected to the first member of the pair at station 2 and terminal point $s^6$ of the next inductance section in series to the second of the contact points at station 2, and so on to station 9 where the single contact point is connected with the terminal point $s^{17}$ of the last inductance section in the series. The main lead SL' is connected to the switch plate E (see Fig. 2) through the rod D and as heretofore stated the index finger E' of the fan switch is in electrical contact with the switch plate. If, now, the handle B' be turned to the right or clockwise as viewed in Fig. 2 and the index finger E' placed in contact with the first of the pair at station 1, so that the pointer of the finger E' is over the numeral 1 marked on the head of the spool B, the first inductance section between points $s'$ and $s^2$ will be included in circuit between the main leads SL' SL². If the index finger E' be then moved to the station marked 2 the first and second inductance sections will then be included in circuit in series and so on until the index finger E' stands at the station marked 9 when all of the sections of coil SC will be in series between the main leads.

The inductance values of the circuit in which the coils PC SC perform their function may not only be selected and adjusted by means of the control keys of the primary and the control switch of the secondary, but may also be varied by moving the secondary coil along the rod D.

It will now be observed that the mechanical and structural arrangement of the above described inductances and adjusting and selecting devices enables the operator to control and select his inductances readily and accurately. The handle B' not only controls the movement of the fan switch but is also a convenient handle by which to slide the secondary coil SC bodily to any desired position upon its track and these operating devices of the apparatus are conveniently close to the controlling keys by which the inductance values of the primary are selected, and the sliding contact controlled by the handle G² is also easily accessible and near to the other controlling handles and keys of this portion of the apparatus. All of the controlling devices are permanently in place so that the inconvenience, uncertainty and fumbling which attend the use of loose and separate contact plugs is avoided. After an operator has become accustomed to this apparatus he can select and operate the keys of the primary merely by sense of touch leaving his eye free to observe the positions of such other adjusting arrangements as he may wish to manipulate at the same time such as, for instance, the pointers which indicate the capacity values of condensers. Again, in tabulating inductance adjustments suited to communicate with stations of which the period is known, the devices above described will be found convenient in that they involve a minimum number of tabulation factors. If it is found for instance that perfect tuning for a given station is secured with key K⁴ at station D, depressed, index finger E' at station 2 and the handle B' at the scale mark 35 on the rod D, the tabulation for this station will simply be D—2—35 so that after a short term of actual operation the arrangement of tabulation factors can easily be remembered, each group of three representing as by a cipher code a given station with which the operator is accustomed to communicate. Normally the sliding point G (Fig. 3) will be so placed that the total number of turns of the first inductance section will be in circuit and after the tuning is perfected as far as may be by operation of the other mechanical adjuncts on the apparatus, finer adjustments may be made if necessary by means of the sliding contact G. Ordinarily, only one of the keys K' to K¹⁰ inclusive should be depressed at a time and it is only in extraordinary cases that the operator may wish to decrease the inductance by including sections in parallel, depressing more than one key. The inductance values of the several sections in each of the coils may be equal but preferably should progress say by having the lowest value of inductance in the primary controlled by the first key K' at station A and having the values represented by the keys increase to the right. When a key controlling the required inductance is down only the portion of the coil required is in circuit, the remainder being out of circuit at both ends eliminating the disadvantages of disturbing resonance incident to the employment of inductances which are incapable of being wholly cut out. Changes in inductance values can be made instantly.

In Fig. 3 the main leads are shown as connected with an apparatus of standard arrangement which is merely shown diagrammatically. Detectors which may be of crystal rectifier type are indicated at H and control switch at J', J² and J³. The arrangement and operation of such an apparatus and its relation with the inductance coils PC SC will be understood by those skilled in the art without detailed description.

What I claim and desire to secure by Letters Patent is:

1. In a transformer for resonant circuits, an inductance coil comprising a series of inductance sections, a main lead connected with the first of said sections, groups of contact members, corresponding in number to the inductance sections, each group comprising two pairs of contacts, the first pair of each group normally out of contact, one of said first pair connected with a main lead, the other to a terminal of an inductance section; the second pair of each group normally in contact, one of said second pair connected to the inductance section terminal to which a member of the first pair is connected, the other of said second pair connected with a terminal of the inductance section next in series, and means to reverse the connection relations between the pairs of contact members in any group, so as to connect the pair which is normally out of contact, and separate the pair which is normally in contact.

2. In a transformer for resonant circuits, an inductance coil comprising a series of inductance sections, a main lead connected by sliding turn-to-turn contact with the first of said sections, groups of contact members, corresponding in number to the inductance sections, each group comprising two pairs of contacts, the first pair of each group normally out of contact, one of said first pair connected with a main lead, the other to a terminal of an inductance section, the second pair of each group normally in contact, one of said second pair connected to the inductance section terminal to which a member of the first pair is connected, the other of said second pair connected with a terminal of the inductance section next in series, and means to reverse the connection relations between the pairs of contact members in any group, so as to connect the pair which is normally out of contact and separate the pair which is normally in contact.

3. In a transformer for resonant circuits, an inductance coil comprising a series of inductance sections, a main lead connected with the first of said sections, groups of contact members, corresponding in number to the inductance sections, each group comprising two pairs of contacts, the first pair of each group normally out of contact, one of said first pair connected with a main lead the other to a terminal of an inductance section, the second pair of each group normally in contact, one of said second pair connected to the inductance section terminal to which a member of the first pair is connected, the other of said second pair connected with a terminal of the inductance section next in series, means to reverse the connection relations between the pairs of contact members in any group, so as to connect the pair which is normally out of contact, and separate the pair which is normally in contact, in combination with a complementary inductance coil which comprises a series of inductance sections, whereof the first is connected at one end to a main lead, a series of pairs of insulated contact points, terminals of adjacent inductance sections connected respectively with the contact points of each pair, a contact point connected with the final terminal of the last inductance section in the series, a second main lead, and means to connect the inductance sections, through the contact points by serial addition or subtraction.

4. In a transformer for resonant circuits, an inductance coil comprising a series of inductance sections, a main lead connected by a sliding turn-to-turn contact with the first of said sections, groups of contact members, corresponding in number to the inductance sections, each group comprising two pairs of contacts, the first pair of each group normally out of contact, one of said first pair connected with a main lead, the other to a terminal of an inductance section, the second pair of each group normally in contact, one of said second pair connected to the inductance section terminal to which a member of the first pair is connected, the other of said second pair connected with a terminal of the inductance section next in series, means to reverse the connection relations between the pairs of contact members in any group, so as to connect the pair which is normally out of contact and separate the pair which is normally in contact, in combination with a complementary inductance coil which comprises a series of inductance sections, whereof the first is connected at one end to a main lead, a series of pairs of insulated contact points, terminals of adjacent inductance sections connected respectively with the contact points of each pair, a contact point connected with the final terminal of the last inductance section in the series, a second main lead, and means to connect the inductance sections, through the contact points by serial addition or subtraction.

5. In a transformer for resonant circuits, an inductance coil comprising a series of inductance sections, a main lead connected with the first of said sections, groups of contact members, corresponding in number to the inductance sections, each group comprising two pairs of contacts, the first pair of each group normally out of contact, one of said first pair connected with a main lead the other to a terminal of an inductance section, the second pair of each group normally in contact, one of said second pair connected to the inductance section terminal to which a member of the first pair is connected, the other of said second pair connected with a terminal of the inductance section next in series, means to reverse the connection relations between the pairs of contact members in any group, so as to connect the pair which is normally out of contact, and separate the pair which is normally in contact, in combination with a complementary inductance coil which comprises a series of inductance sections, whereof the first is connected at one end to a main lead, a series of pairs of insulated contact points, terminals of adjacent inductance sections connected respectively with the contact points of each pair, a contact point connected with the final terminal of the last inductance section in the series, a second main lead, and means to connect the inductance sections, through the contact points by serial addition or subtraction, the mutually complementary inductance coils being relatively axially movable.

6. In a transformer for resonant circuits, an inductance coil comprising a series of inductance sections, a main lead connected by sliding turn-to-turn contact with the first of said sections, groups of contact members, corresponding in number to the inductance sections, each group comprising two pairs of contacts, the first pair of each group normally out of contact, one of said first pair connected with a main lead, the other to a terminal of an inductance section, the second pair of each group normally in contact, one of said second pair connected to the inductance section terminal to which a member of the first pair is connected, the other of said second pair connected with a terminal of the inductance section next in series, means to reverse the connection relations between the pairs of contact members in any group, so as to connect the pair which is normally out of contact and separate the pair which is normally in contact, in combination with a complementary inductance coil which comprises a series of inductance sections, whereof the first is connected at one end to a main lead, a series of pairs of insulated contact points terminals of adjacent inductance sections connected respectively with the contact points of each pair, a contact point connected with final terminal of the last inductance section in the series, a second main lead, and means to connect the inductance sections, through the contact points by serial addition or subtraction, the mutually complementary inductance coils being relatively axially movable.

7. In a tuning device for resonant circuits, a casing, an inductance coil mounted in the casing, a complementary inductance coil movable and adjustable in axial direction, each coil subdivided into a series of inductance sections, means accessible on the exterior of the casing, to include one or more sections of the stationary coil in circuit, and to isolate the remaining sections, and means carried by the movable coil, to include one or more sections of said coils in circuit and to isolate the remaining sections.

8. In a tuning device for resonant circuits, a casing, an inductance coil mounted in the casing, a complementary inductance coil movable and adjustable in axial direction, each coil subdivided into a series of inductance sections, means accessible on the exterior of the casing, to include one or more sections of the stationary coil in circuit and to isolate the remaining sections, and means carried by the movable coil, to include one or more sections of said coil in circuit and to isolate the remaining sections, one lead connection of the stationary coil having sliding turn-to-turn contact with a section of said coil.

9. In a tuning device for resonant circuits, a casing, an inductance coil in the casing, the casing provided with an opening concentric with said coil, a complementary inductance coil mounted to move in and out of said opening and adjustable axially on a track, said track, each of said coils subdivided into inductance sections, means accessible on the exterior of the casing, to include one or more sections of the stationary inductance coil in circuit, and means carried by the movable coil, including a switch and handle therefor, to include one or more sections of said coil in circuit and to adjust the position of said coil on its track.

10. In a tuning device for resonant circuits, a casing, an inductance coil in the casing, the casing provided with an opening concentric with said coil, a complementary inductance coil, mounted to move in and out of said opening, and adjustable axially on a track, said track, each of said coils subdivided into inductance sections, means accessible on the exterior of the casing, to include one or more sections of the stationary inductance coil in circuit, and means carried by the movable coil, including a switch and handle therefor, to include any one or more sections of said coil in circuit and to adjust the position of said coil on its track, one lead connection of the stationary coil having sliding turn-to-turn contact with a section of said coil.

Signed by me at Boston, Suffolk county, Massachusetts this eleventh day of January 1910.

WILLIAM L. WALKER.

Witnesses:
ODEN ROBERTS,
CHARLES D. WOODBERRY.